US012791042B2

(12) United States Patent
Beers et al.

(10) Patent No.: US 12,791,042 B2
(45) Date of Patent: *Nov. 10, 2026

(54) ADDITIVELY MANUFACTURED INTEGRAL SHAFT AND MOTOR ROTOR HEAT EXCHANGER AND TIE ROD FOR RAM AIR FAN

(71) Applicant: Hamilton Sundstrand Corporation, Charlotte, NC (US)

(72) Inventors: Craig M. Beers, Wethersfield, CT (US); Brent J. Merritt, Southwick, MA (US)

(73) Assignee: HAMILTON SUNDSTRAND CORPORATION, Charoltte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/762,997

(22) Filed: Jul. 3, 2024

(65) Prior Publication Data

US 2026/0009404 A1 Jan. 8, 2026

(51) Int. Cl.

*F04D 29/58* (2006.01)
*F04D 29/043* (2006.01)
*B33Y 80/00* (2015.01)

(52) U.S. Cl.

CPC ......... *F04D 29/588* (2013.01); *F04D 29/043* (2013.01); *B33Y 80/00* (2014.12)

(58) Field of Classification Search

CPC ...... F04D 29/58; F04D 29/588; F04D 29/043; F04D 29/04; F04D 29/053; F04D 29/056; F04D 29/5806; F04D 29/0582; F04D 29/057; F04D 29/584; F04D 29/5853; F04D 19/00; B33Y 80/00; B33Y 10/00; H02K 5/18; F16C 37/002; F28F 1/40

See application file for complete search history.

(56) References Cited

U.S. PATENT DOCUMENTS

| | | | | |
|---|---|---|---|---|
| 3,149,819 | A * | 9/1964 | Baumann | F04D 29/584 384/100 |
| 4,190,398 | A | 2/1980 | Corsmeier et al. | |
| 5,102,305 | A * | 4/1992 | Bescoby | F01D 25/22 417/407 |
| 7,267,523 | B2 * | 9/2007 | Saville | F01D 5/02 417/373 |
| 7,791,238 | B2 | 9/2010 | Pal et al. | |

(Continued)

FOREIGN PATENT DOCUMENTS

| | | | | |
|---|---|---|---|---|
| CA | 2782992 | A1 * | 1/2014 | F28F 13/06 |
| FR | 3065124 | B1 | 10/2020 | |
| GB | 1032990 | A * | 6/1966 | F28D 7/10 |

*Primary Examiner* — Nathaniel E Wiehe
*Assistant Examiner* — Joshua R Beebe
(74) *Attorney, Agent, or Firm* — CANTOR COLBURN LLP

(57) ABSTRACT

A journal bearing shaft is provided and includes a single monolithic body. The single monolithic body includes a tie rod, an end cap integrally connected to and extending radially outwardly from an end of the tie rod and defining openings, a journal bearing interface portion integrally connected to and extending aft from a distal edge of the end cap and a heat exchanger integrally connected to and extending aft from an aft edge of the journal bearing interface portion and including an exterior body and heat exchange fins extending radially between the exterior body and the tie rod.

20 Claims, 5 Drawing Sheets

(56) References Cited

U.S. PATENT DOCUMENTS

| | | | | |
|---|---|---|---|---|
| 8,672,768 | B2 * | 3/2014 | Colson | F04D 19/00 464/183 |
| 8,729,751 | B2 * | 5/2014 | Telakowski | H02K 1/32 310/64 |
| 9,683,569 | B2 | 6/2017 | Collins et al. | |
| 10,495,090 | B2 | 12/2019 | Collins et al. | |
| 10,830,281 | B2 | 11/2020 | Panara et al. | |
| 11,459,909 | B2 | 10/2022 | Diosady et al. | |
| 12,421,974 | B1 | 9/2025 | Beers et al. | |
| 12,467,469 | B2 | 11/2025 | Beers et al. | |
| 2007/0018516 | A1 * | 1/2007 | Pal | F04D 25/082 310/58 |
| 2009/0053075 | A1 | 2/2009 | Cox | |
| 2017/0089264 | A1 | 3/2017 | Jones et al. | |
| 2018/0266440 | A1 | 9/2018 | Shiozawa | |
| 2022/0161937 | A1 | 5/2022 | Fujiwara | |
| 2022/0194600 | A1 * | 6/2022 | Army | F04D 19/002 |
| 2026/0022897 | A1 | 1/2026 | Beers et al. | |

* cited by examiner

ADDITIVELY MANUFACTURED INTEGRAL SHAFT AND MOTOR ROTOR HEAT EXCHANGER AND TIE ROD FOR RAM AIR FAN

BACKGROUND

The present disclosure relates to ram air fan construction and, more particularly, to an additively manufactured integral shaft and motor rotor heat exchanger and tie rod for a ram air fan.

Fans are often used to move air. Fans may, for example, move air through heat exchangers of air conditioning packs on aircraft. The air moved by the fans cools the heat exchangers. Such fans within aircraft are often ram air fans. When the aircraft is on the ground, motors are typically used to rotate the rotors of the ram air fans. Absent intervention, thermal energy from the motor can build up within components of fans used in this manner. Ram air fans typically include heat exchangers to remove heat from the components susceptible to thermal buildup.

Existing heat exchangers utilized for this purpose typically include heat dissipation fins constructed of folded sheet metal, with the fins being brazed, or otherwise affixed as a heat exchanger insert into a housing structure, such as a journal bearing shaft. This combined structure is placed in thermal communication with the motor, and cooling air is passed over the fins thereby cooling the motor. Such heat exchange structures are complex, expensive, time consuming to construct and are difficult to repair.

SUMMARY

According to an aspect of the disclosure, a journal bearing shaft is provided and includes a single monolithic body. The single monolithic body includes a tie rod, an end cap integrally connected to and extending radially outwardly from an end of the tie rod and defining openings, a journal bearing interface portion integrally connected to and extending aft from a distal edge of the end cap and a heat exchanger integrally connected to and extending aft from an aft edge of the journal bearing interface portion and including an exterior body and heat exchange fins extending radially between the exterior body and the tie rod.

In accordance with additional or alternative embodiments, a length of the tie rod exceeds a total length of the journal bearing interface portion and the heat exchanger.

In accordance with additional or alternative embodiments, the end cap includes an inboard end cap portion, which extends radially outwardly from the end of the tie rod and an outboard end cap portion, which extends radially outwardly and aft from a distal edge of the inboard end cap portion.

In accordance with additional or alternative embodiments, the journal bearing interface portion and the heat exchanger are coaxial with the tie rod.

In accordance with additional or alternative embodiments, an interior diameter of the heat exchanger is smaller than an interior diameter of the journal bearing interface portion.

In accordance with additional or alternative embodiments, a number of the heat exchange fins is 24.

In accordance with additional or alternative embodiments, a number of the heat exchange fins is 12-32.

In accordance with additional or alternative embodiments, a number of the heat exchange fins is 12-64.

According to an aspect of the disclosure, a ram air fan assembly is provided and includes a fan rotor to move air from a fan inlet to a fan outlet and a journal bearing shaft disposed as a single monolithic body within the fan rotor and defining a flow path for cooling air. The single monolithic body includes a tie rod, an end cap integrally connected to and extending radially outwardly from an end of the tie rod and defining openings, a journal bearing interface portion integrally connected to and extending aft from a distal edge of the end cap and a heat exchanger integrally connected to and extending aft from an aft edge of the journal bearing interface portion and including an exterior body and heat exchange fins extending radially between the exterior body and the tie rod.

In accordance with additional or alternative embodiments, a length of the tie rod exceeds a total length of the journal bearing interface portion and the heat exchanger.

In accordance with additional or alternative embodiments, the end cap includes an inboard end cap portion, which extends radially outwardly from the end of the tie rod, and an outboard end cap portion, which extends radially outwardly and aft from a distal edge of the inboard end cap portion.

In accordance with additional or alternative embodiments, the journal bearing interface portion and the heat exchanger are coaxial with the tie rod.

In accordance with additional or alternative embodiments, an interior diameter of the heat exchanger is smaller than an interior diameter of the journal bearing interface portion.

In accordance with additional or alternative embodiments, a number of the heat exchange fins is 24.

In accordance with additional or alternative embodiments, a number of the heat exchange fins is 12-32.

In accordance with additional or alternative embodiments, a number of the heat exchange fins is 12-64.

According to an aspect of the disclosure, a method of additively manufacturing a journal bearing shaft as a single monolithic body. The method includes building up a first tie rod portion, simultaneously building up a second tie rod portion from the first tie rod portion and a heat exchanger about the second tie rod portion to include an exterior body and heat exchange fins extending radially between the second tie rod portion and the exterior body, simultaneously building up a third tie rod portion from the second tie rod portion and a journal bearing interface portion from the heat exchange portion and about the third tie rod portion and simultaneously building up an end of the tie rod from the third tie rod portion and an end cap from the journal bearing interface portion to connect with the end of the tie rod.

In accordance with additional or alternative embodiments, the building up of the end cap includes building up an inboard end cap portion to extend radially outwardly from the end of the tie rod and building up an outboard end cap portion from the journal bearing interface portion to extend radially outwardly and aft from a distal edge of the inboard end cap portion.

In accordance with additional or alternative embodiments, the building up of the heat exchanger and the second tie rod portion is executed such that the heat exchanger and the second tie rod portion are coaxial and the building up of the journal bearing interface portion and the third tie rod portion are executed such that the journal bearing interface portion and the third tie rod portion are coaxial.

In accordance with additional or alternative embodiments, the building up of the heat exchanger and the journal bearing interface portion are executed such that an interior diameter of the heat exchanger is smaller than an interior diameter of the journal bearing interface portion.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

In conventional ram air fans, a stainless steel shaft supports a motor rotor and provides for a journal bearing interface and motor rotor cooling air flows proceed through a shaft inner diameter. Current heat exchangers are typically fabricated from sheet metal and are formed with fins that are brazed onto the shaft. A spring at the inner diameter supports and is brazed to the fins. This arrangement can lead to expense and complexity and the brazing often requires rework, repair and scrapping of faulty parts.

Thus, as will be described below, a ram air fan is provided with an additively manufactured shaft with integral an integral heat exchanger. An end cap and a tie rod, which are typically separate, can also be integrated into the shaft. This eliminates a need for a nut and washer combination on the end of the shaft. The shaft assembly can be formed of various materials including, but not limited to, stainless steel, Inconel™ or other similar materials or combinations thereof. For a bi-metallic configuration, the heat exchange fin material can include, but is not limited to, one or more of copper, nickel or nickel alloys (such as 200AM, In625 or other similar materials or combinations thereof), corrosion resistant steel (17-4 or similar), aluminum alloys (A20x or similar), titanium or combinations thereof. The tie rod can be connected to an inner diameter of a cylinder of the heat exchanger or held to close clearance. A connection to the inner diameter of the heat exchanger eliminates the need for a central support and provides for a clearance benefit if more stretch and/or preload is desired.

Figure 1:
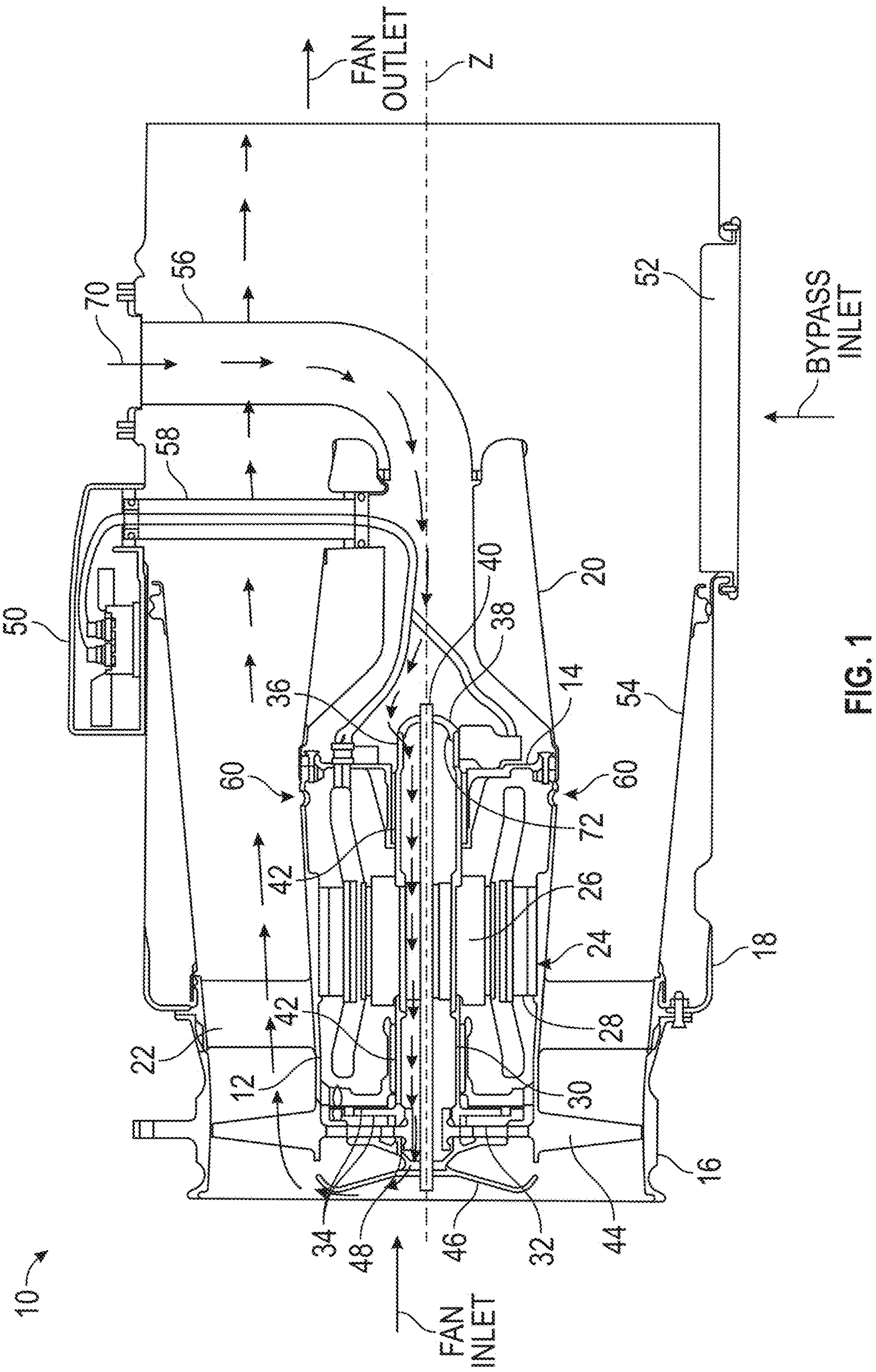
FIG. 1 is a side view of a ram air fan assembly in accordance with embodiments.

With reference to FIG. 1, a ram air fan assembly 10 is provided and it is to be appreciated that various structures and assemblies may be altered from the example embodiment while still falling within the scope of the systems and methods described herein. The ram air fan assembly 10 includes a fan housing 12, a bearing housing 14, an inlet housing 16, an outer housing 18 and an inner housing 20. The fan housing 12 includes fan struts 22, a motor 24 including a motor rotor 26 and a motor stator 28, a thrust shaft 30, a thrust plate 32 and thrust bearings 34. The bearing housing 14 includes a journal bearing shaft 36 and a shaft cap 38. The fan housing 12 and the bearing housing 14 together include a tie rod 40 and journal bearings 42. The inlet housing 16 includes a fan rotor 44, a shroud 46 and a hub 48 in addition to a portion of the tie rod 40. The outer housing 18 includes a terminal box 50 and a plenum 52. Within the outer housing 18 are a diffuser 54, a motor bearing cooling tube 56 and a wire transfer tube 58. A fan inlet is a source of air to be moved by the ram air fan assembly 10 in the absence of sufficient ram air pressure. A bypass inlet is a source of air that moves through ram air fan assembly 10 when sufficient ram air pressure is available. The ram air fan assembly 10 further includes drain holes 60 in the fan housing 12. Axis Z extends along a central axis of ram air fan assembly 10.

As illustrated in FIG. 1, the inlet housing 16 and the outer housing 18 are attached to the fan housing 12 at the fan struts 22. The bearing housing 14 is attached to the fan housing 12 and the inner housing 20 connects the motor bearing cooling tube 56 and the wire transfer tube 58 to the bearing housing 14. The motor bearing cooling tube 56 connects the inner housing 20 to a source of cooling air at the outer housing 18. The wire transfer tube 58 connects the inner housing 20 to the outer housing 18 at the terminal box 50. The motor stator 28 and the thrust plate 32 attach to the fan housing 12. The motor rotor 26 is included within the motor stator 28 and connects the journal bearing shaft 36 to the thrust shaft 30. The journal bearing shaft 36, the motor rotor 26 and the thrust shaft 30 define an axis of rotation for the ram air fan assembly 10. The fan rotor 44 is attached to the thrust shaft 30 with the tie rod 40 extending along the axis of rotation from the shaft cap 38 at the end of the journal bearing shaft 36 through the motor rotor 26, the thrust shaft 30 and the fan rotor 44 to the hub 48 and the shroud 46. Nuts (not shown) secure the shaft cap 38 to the journal bearing shaft 36 on one end of the tie rod 40 and the hub 48 and the shroud 46 to the fan rotor 44 at an opposite end of the tie rod 40. The thrust plate 32 and the fan housing 12 include a flange-like portion of the thrust shaft 30, with the thrust bearings 34 positioned between the flange-like portion of the thrust shaft 30 and the thrust plate 32 and between the flange-like portion of the thrust shaft 30 and the fan housing 12. The journal bearings 42 are positioned between the journal bearing shaft 36 and the bearing housing 14 and between the thrust shaft 30 and the fan housing 12. The hub 48, the shroud 46, the fan rotor 44 and a portion of the fan housing 12 are included within the inlet housing 16. The diffuser 54 is attached to an inner surface of the outer housing 18. The plenum 52 can be provided as a portion of the outer housing 18 that connects the ram air fan assembly 10 to the bypass inlet. The inlet housing 16 is connected to the fan inlet and the outer housing 18 is connected to the fan outlet.

In operation, the ram air fan assembly 10 is installed into an environmental control system (ECS) aboard an aircraft and is connected to the fan inlet, the bypass inlet and the fan outlet. When the aircraft does not move fast enough to generate sufficient ram air pressure to meet the cooling needs of the ECS, power is supplied to motor stator 28 by wires running from the terminal box 50, through the wire transfer tube 58, the inner housing 20 and the bearing housing 14.

Energizing the motor stator 28 causes the rotor 24 to rotate about axis Z thereby rotating the journal bearing shaft 36 and the thrust shaft 30. The fan rotor 44, the hub 48 and the shroud 46 also rotate by way of their respective connections to the thrust shaft 30. The journal bearings 42 and the thrust bearings 34 provide low friction support for the rotating components. As the fan rotor 44 rotates, it moves air from the fan inlet, through the inlet housing 20, past the fan struts 22 and into the space between the fan housing 12 and the outer housing 18, increasing the air pressure in the outer housing 18. As the air moves through the outer housing 18, it flows past the diffuser 54 and the inner housing 20, where the air pressure is reduced due to the shape of the diffuser 54 and the shape of the inner housing 20. Once past the inner housing 20, the air moves out of the outer housing 18 at the fan outlet.

Components within the bearing housing 14 and the fan housing 12, especially the thrust bearings 34, the journal bearings 42 and the motor 24, generate significant heat and are cooled to prevent sub-optimal operation. Cooling air 70 is provided by the motor bearing cooling tube 56 which directs the flow of cooling air 70 to the inner housing 20. The inner housing 20 directs the flow of cooling air 70 to the bearing housing 14, where the cooling air 70 flows past components in the bearing housing 14 and the fan housing 12, the thrust plate 32, the tie rod 40 and components of the motor 24. In some examples, one of the routes available for the cooling air is through the journal bearing shaft 36, allowing heat exchange fins included within the journal bearing shaft 36 to enhance heat transfer and improve the cooling effect. The cooling air 70 then exits the fan housing 12 through cooling holes in the fan rotor 44. Condensation can form and settle in the fan housing 12 when the cooling air 70 mixes with the heat from the thrust bearings 34, the journal bearings 42 and the motor 24 in the fan housing 12. This condensation can cause problems with the operation of the journal bearings 42 and the motor 24. The drain holes 60 are provided in the fan housing 12 to drain the condensation out of the fan housing 12 and into the air flowing through the ram air fan assembly 10 and out of the fan outlet.

The cooling air 70 of FIG. 1 is illustrated as generally traveling along a single flow path through the journal bearing shaft 36. It is appreciated, however, that the cooling air 70 drawn through the cooling tube 56 may be passed along additional flow paths through the inner housing 20 to cool additional components.

Existing ram air fan assemblies typically utilize cast and milled components, and the design features of the components are limited due to the limitations of those manufacturing processes. However, utilization of modern additive manufacturing techniques, and particularly additively manufactured metal components, allows for the construction of integral parts having internal features and shapes and also allows for tighter tolerances and thinner structural components while still allowing the components to be formed as a single integral structure without using joints, fasteners or material adhesion (e.g., brazing). The single integral piece designs facilitated by additive manufacturing reduce overall complexity and improve corresponding assembly processes.

Figure 2:
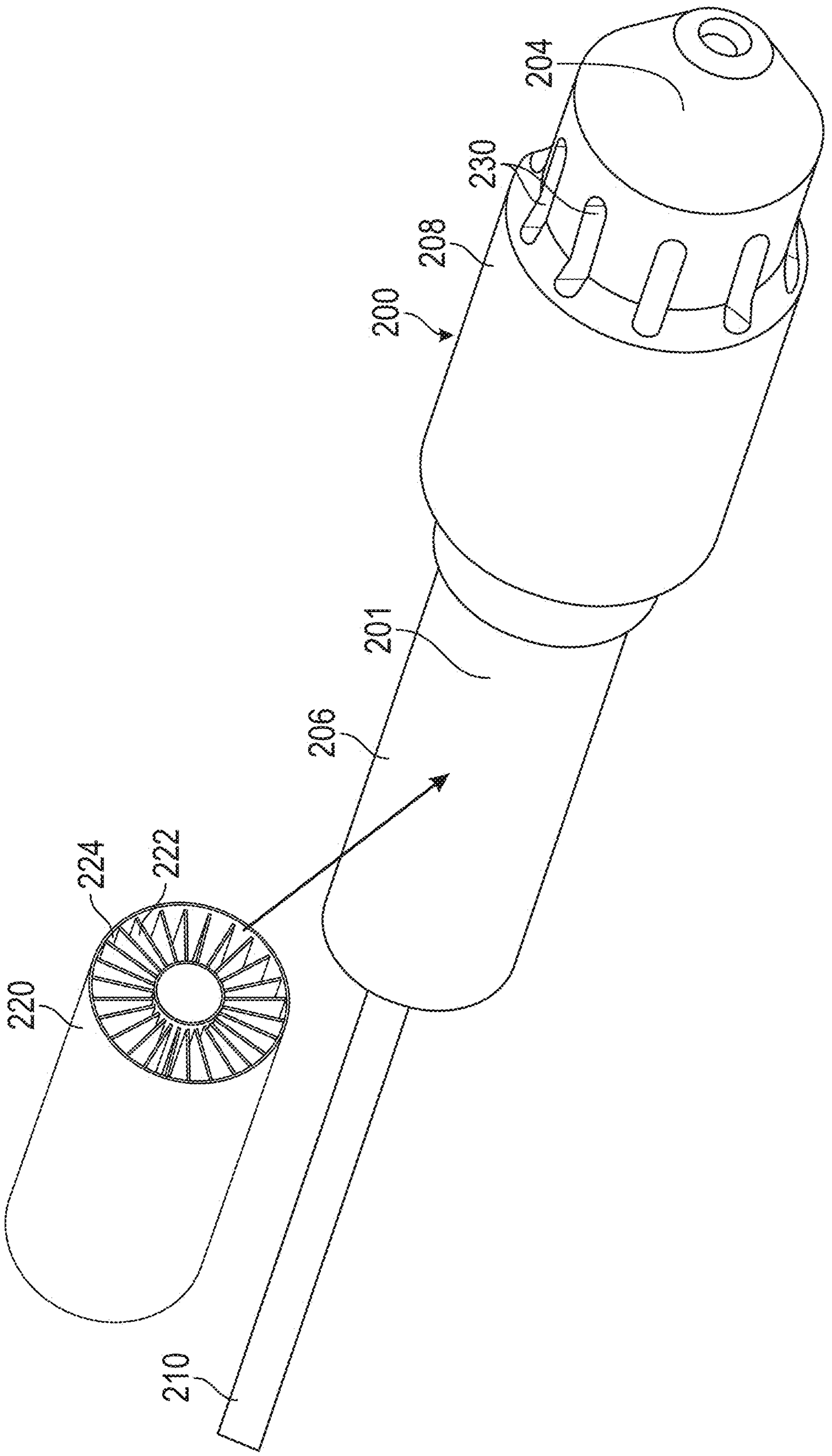
FIG. 2 is a perspective view of a journal bearing shaft provided as a single monolithic body for the ram air fan assembly of FIG. 1 in accordance with embodiments.

Thus, with continued reference to FIG. 1 and with additional reference to FIG. 2, an additively manufactured journal bearing shaft 200 is provided and includes single monolithic body 201 that in turn includes an end cap 204, a main body 206, a journal bearing interface portion 208, a tie rod 210 and a heat exchange element 220, which includes heat exchange fins 222 and an exterior body 224. The end cap 204, the main body 206, the journal bearing interface portion 208, the tie rod 210 and the heat exchange element 220 including the heat exchange fins 222 and the exterior body 224 are all integral with one another, radially balanced about the axis Z and possessed of a suitable overall strength. A set of openings 230 at the end cap 204 provide for cooling air passages that allow the cooling air flow 70 (see FIG. 1) to enter and pass through the interior of the journal bearing shaft 200 and the heat exchange element 220.

The single monolithic body 201 of the journal bearing shaft 200 can be disposed as a single integral part in the ram air fan assembly 10 of FIG. 1 and within the fan rotor 44 to replace the tie rod 40, the shaft cap 38, the journal bearing shaft 36 whereby the tie rod 210 extends along the axis Z, the journal bearing interface portion 208 interfaces with the journal bearings 42, the openings 230 permit a flow of the cooling air 70 to proceed into an interior of the journal bearing shaft 200 and the heat exchange element 220 is disposed in the path of the cooling air 70. The journal bearing shaft 200 can be additively manufactured using a metal such as stainless steel, a nickel-chromium-based superalloy (e.g., Inconel®) or any similar metal or combinations thereof that provide sufficient structural strength and a thermal pathway for heat to transfer from an adjacent electric motor to cooling air.

Figure 3:
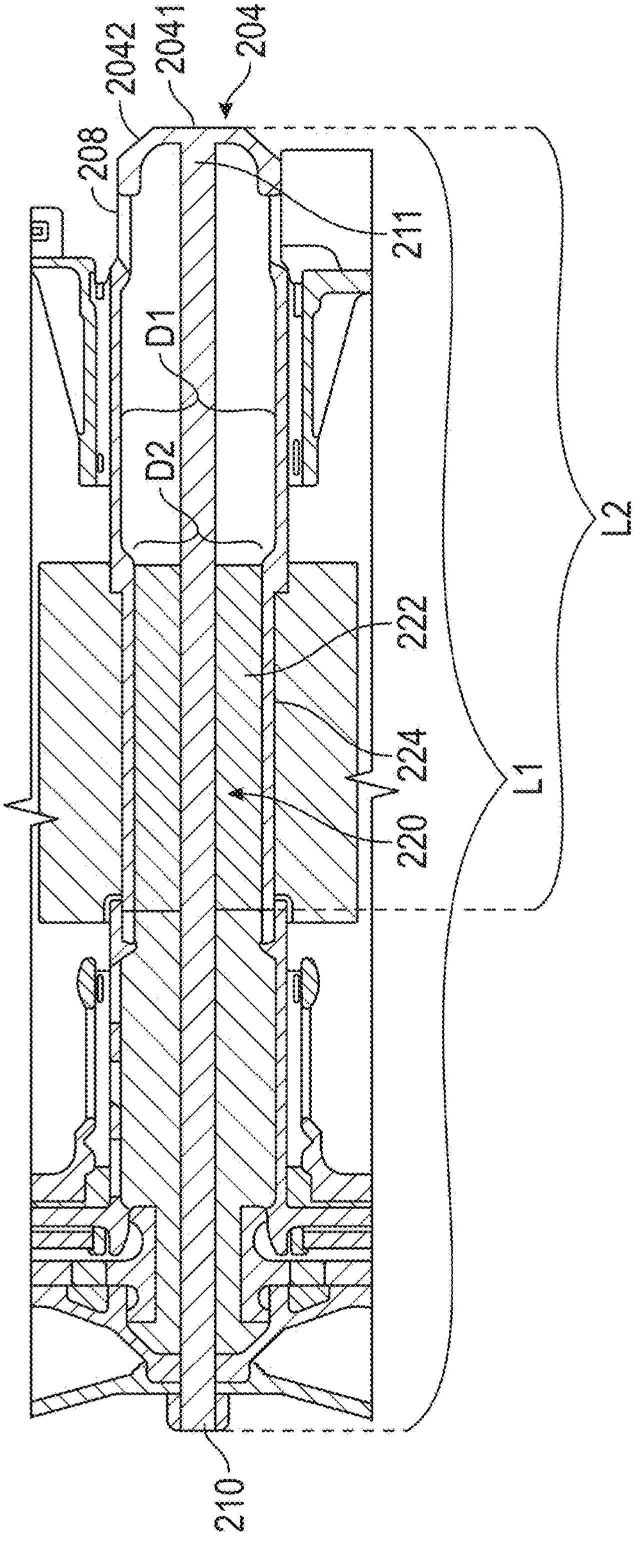
FIG. 3 is a side view of the journal bearing shaft of FIG. 2 installed in a ram air fan assembly in accordance with embodiments.

With continued reference to FIG. 2 and with additional reference to FIG. 3, the single monolithic body 201 of the journal bearing shaft 200 is formed as a single integral part for disposition in the ram air fan assembly 10 of FIG. 1. In this way, the tie rod 210 extends forwardly along a central axis (i.e., axis Z of FIG. 1) for a length L1 that exceeds a total length L2 of the journal bearing interface portion 208 and the heat exchange element 220. An end 211 of the tie rod 210 integrally connects with the end cap 204. The end cap 204 includes an inboard end cap portion 2041 and an outboard end cap portion 2042. The inboard end cap portion 2041 extends radially outwardly from the tie rod 210. The outboard end cap portion 2042 extends radially outwardly and aft from a distal edge of the inboard end cap portion 2041. A distal edge of the outboard end cap portion 2042 integrally connects with the journal bearing interface portion 208. The journal bearing interface portion 208 extends aft, is coaxial with the tie rod 210 and has an internal diameter D1. The heat exchange element 220 is integrally connected to and extends aft from an aft edge of the journal bearing interface portion 208 and is coaxial with the tie rod 210. The exterior body 224 has an internal diameter D2 that can be smaller than the internal diameter D1. The heat exchange fins 222 extend radially from an interior surface of the exterior body 224 to the tie rod 210.

Figure 4:
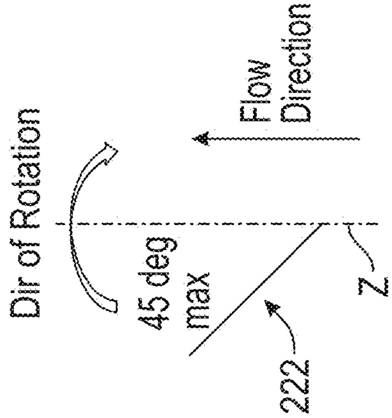
FIG. 4 is a schematic illustration of an angling of heat exchange fins of the journal bearing shaft of FIGS. 2 and 3 in accordance with embodiments.

With reference to FIG. 4 and in accordance with embodiments, the heat exchange fins 222 can have a lead angle of up to 45 degrees for example although it is to be understood that this lead angle can be increased or decreased as necessary. Also and in accordance with additional embodiments, a number of the heat exchange fins 222 can be variable (i.e., 24 heat exchange fins 222, 12-64 heat exchange fins 222, 12-32 heat exchange fins 222 as examples).

Figure 5:
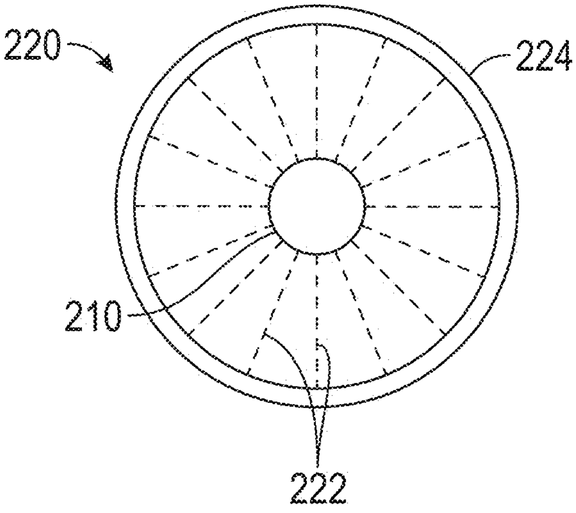
FIG. 5 is an axial view of a heat exchange element with a bi-metal construction in accordance with embodiments.

With reference to FIG. 5 and in accordance with embodiments, one or more portions of the journal bearing shaft 200 can have a bi-metal structure. For example, as shown in FIG. 5, the tie rod 210 and the exterior body 224 of the heat exchange element 220 can be formed of a first material such as one or more of stainless steel, Inconel™ or other similar materials or combinations thereof and the heat exchange fins 222 can be formed of a second material such as one or more of copper, nickel or nickel alloys (such as 200AM, In625 or other similar materials or combinations thereof), corrosion resistant steel (17-4 or similar), aluminum alloys (A20x or similar), titanium or combinations thereof. In accordance with further embodiments, at least one or more of the tie rod 210, the end cap 204 and the journal bearing interface portion 208 can be formed of the first material.

The heat exchange fins 222 can be formed to define axial gaps to maintain a desired axial spacing between sets of heat exchange fins 222. The heat exchange fins 222 can also be precisely placed, such that they are evenly distributed, and create an easily predictable flowpath and/or distributed at precise axial locations where heat transfer is desired without requiring the location to be directly accessible via an insert. In addition, the heat exchange fins 222 can include different features at different axial positions, including different thicknesses, different surface features, rotations and the like and without complexity of assembly. In addition, tighter tolerances afforded by additive manufacturing allow for more precisely evenly spaced heat exchange fins 222, thereby improving a native balance of the journal bearing shaft 200 and minimizing the complexity and cost of a component balancing step.

In addition, the additive manufacturing process to form the journal bearing shaft 200 can be utilized to incorporate additional non-castable features into various components, such as the heat exchange fins 222. The non-castable features can be any physical structures that either could not be cast due to materials and existing technique limitations, could not be milled due to tooling limitations and/or would be cost prohibitive to create using existing casting and/or milling techniques. By way of example, internal features in tight tolerances are non-castable as even using expendable mold casting techniques as the material of the mold cannot be fully cleared out of the internal passages when the non-castable features are present. Furthermore, by additively manufacturing the journal bearing shaft 200 as a single integral part, the non-castable features can be included in less than the full length of the journal bearing shaft 200 and are not required to be distributed evenly along the axis Z.

Figure 6:
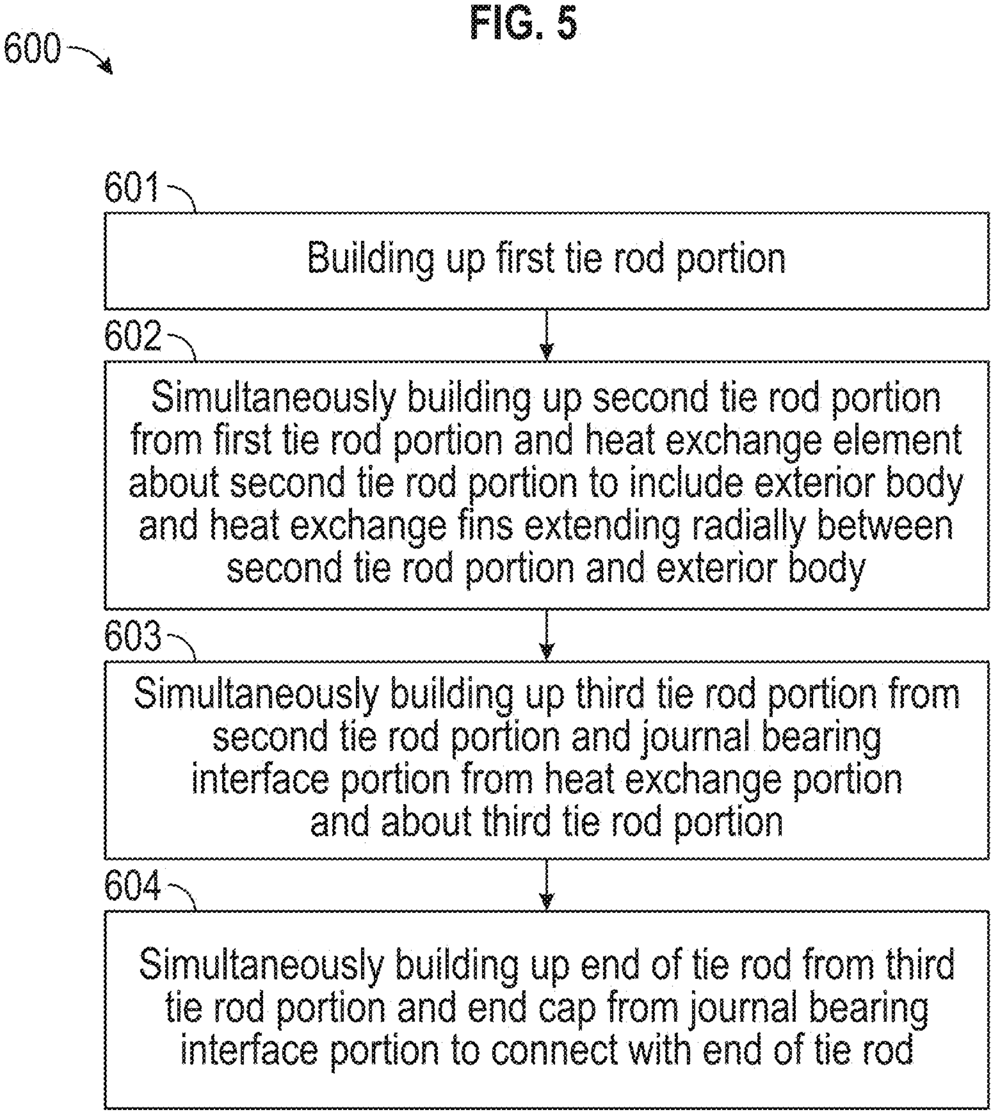
FIG. 6 is a flow diagram illustrating a method of additively manufacturing a journal bearing shaft as a single monolithic body in accordance with embodiments.

With reference to FIG. 6, a method 600 of additively manufacturing a journal bearing shaft, such as the journal bearing shaft 200, as a single monolithic body is provided. The method 600 includes building up a first tie rod portion in a layer-by-layer sequence by an additive manufacturing process such as laser powder bed fusion (PBF-L) or another similar process (block 601). The method further includes simultaneously building up a second tie rod portion from the first tie rod portion and a heat exchange element about the second tie rod portion to include an exterior body and heat exchange fins extending radially between the second tie rod portion and the exterior body in a layer-by-layer sequence by an additive manufacturing process such as PBF-L or another similar process (block 602), simultaneously building up a third tie rod portion from the second tie rod portion and a journal bearing interface portion from the heat exchange portion and about the third tie rod portion in a layer-by-layer sequence by an additive manufacturing process such as PBF-L or another similar process (block 603) and simultaneously building up an end of the tie rod from the third tie rod portion and an end cap from the journal bearing interface portion to connect with the end of the tie rod in a layer-by-layer sequence by an additive manufacturing process such as PBF-L or another similar process (block 604).

In accordance with embodiments, the building up of the end cap of block 604 can include building up an inboard end cap portion to extend radially outwardly from the end of the tie rod and building up an outboard end cap portion from the journal bearing interface portion to extend radially outwardly and aft from a distal edge of the inboard end cap portion. Also, the building up of the heat exchange element and the second tie rod portion of block 602 is executed such that the heat exchange element and the second tie rod portion can be coaxial and the building up of the journal bearing interface portion and the third tie rod portion of block 603 are executed such that the journal bearing interface portion and the third tie rod portion can be coaxial. In addition, the building up of the heat exchange element and the journal bearing interface portion of block 602 and block 603 are executed such that an interior diameter of the heat exchange element can be smaller than an interior diameter of the journal bearing interface portion.

Figure 7:
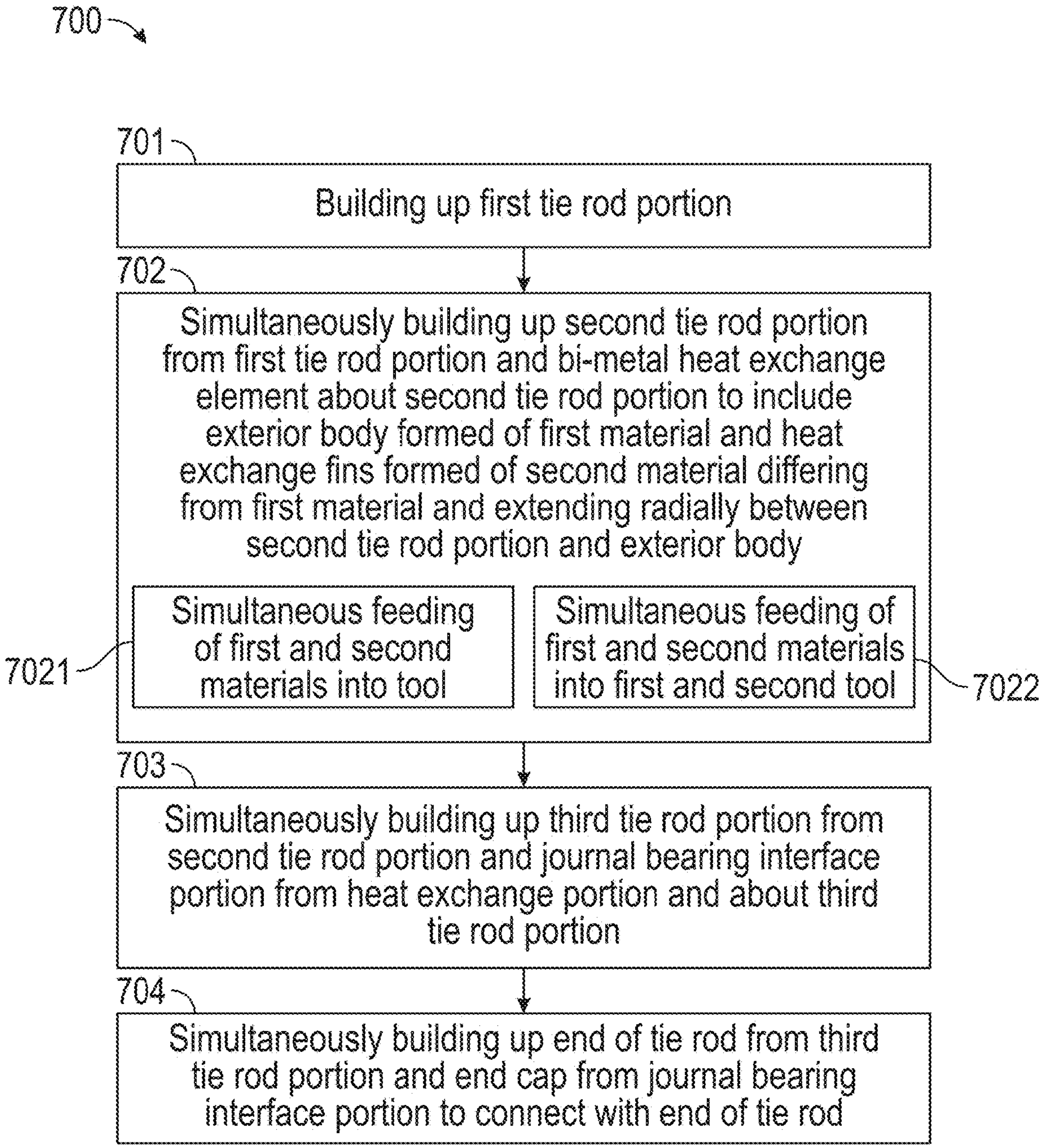
FIG. 7 is a flow diagram illustrating a method of additively manufacturing a journal bearing shaft as a single monolithic body with a bi-metal construction in accordance with embodiments.

With reference to FIG. 7, a method 700 of additively manufacturing a journal bearing shaft, such as the journal bearing shaft 200, as a single monolithic body with a bi-metal construction is provided. The method 700 includes building up a first tie rod portion in a layer-by-layer sequence by an additive manufacturing process such as laser powder bed fusion (PBF-L) or another similar process (block 701). The method further includes simultaneously building up a second tie rod portion from the first tie rod portion and a bi-metal heat exchange element about the second tie rod portion to include an exterior body formed of a first material and heat exchange fins formed of a second material differing from the first material and extending radially between the second tie rod portion and the exterior body in a layer-by-layer sequence by an additive manufacturing process such as PBF-L or another similar process (block 702), simultaneously building up a third tie rod portion from the second tie rod portion and a journal bearing interface portion from the bi-metal heat exchange portion and about the third tie rod portion in a layer-by-layer sequence by an additive manufacturing process such as PBF-L or another similar process (block 703) and simultaneously building up an end of the tie rod from the third tie rod portion and an end cap from the journal bearing interface portion to connect with the end of the tie rod in a layer-by-layer sequence by an additive manufacturing process such as PBF-L or another similar process (block 704).

In accordance with embodiments, the building up of the end cap of block 704 can include building up an inboard end cap portion to extend radially outwardly from the end of the tie rod and building up an outboard end cap portion from the journal bearing interface portion to extend radially outwardly and aft from a distal edge of the inboard end cap portion. Also, the building up of the bi-metal heat exchange element and the second tie rod portion of block 702 is executed such that the bi-metal heat exchange element and the second tie rod portion can be coaxial and the building up of the journal bearing interface portion and the third tie rod portion of block 703 are executed such that the journal bearing interface portion and the third tie rod portion can be coaxial. In addition, the building up of the bi-metal heat exchange element and the journal bearing interface portion of block 702 and block 703 are executed such that an interior diameter of the bi-metal heat exchange element can be smaller than an interior diameter of the journal bearing interface portion.

In accordance with further embodiments, the building up of the bi-metal heat exchanger of block 702 can include simultaneously feeding the first material and the second material into an additive manufacturing tool (block 7021) or alternatively simultaneously feeding the first material into a first additive manufacturing tool and feeding the second material into a second additive manufacturing tool (block 7022).

Technical effects and benefits of the present disclosure are the provision of an additively manufactured integral shaft and motor rotor heat exchanger and tie rod for a ram air fan that can eliminate a need for expensive brazing of multiple details and that can maintain or be very close to thin wall thicknesses of sheet metal fins. The integral tie rod and end cap further reduce detail part count for improved cost, assembly time and improved quality/function as a single unit.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A journal bearing shaft, comprising:

a single monolithic body, the single monolithic body comprising:

a tie rod;

an end cap integrally connected to and extending radially outwardly from an end of the tie rod and defining openings;

a journal bearing interface portion integrally connected to and extending aft from a distal edge of the end cap; and a heat exchanger integrally connected to and extending aft from an aft edge of the journal bearing interface portion and comprising an exterior body and heat exchange fins extending radially between the exterior body and the tie rod.

2. The journal bearing shaft according to claim 1, wherein a length of the tie rod exceeds a total length of the journal bearing interface portion and the heat exchanger.

3. The journal bearing shaft according to claim 1, wherein the end cap comprises:

an inboard end cap portion, which extends radially outwardly from the end of the tie rod; and an outboard end cap portion, which extends radially outwardly and aft from a distal edge of the inboard end cap portion.

4. The journal bearing shaft according to claim 1, wherein the journal bearing interface portion and the heat exchanger are coaxial with the tie rod.

5. The journal bearing shaft according to claim 1, wherein an interior diameter of the heat exchanger is smaller than an interior diameter of the journal bearing interface portion.

6. The journal bearing shaft according to claim 1, wherein a number of the heat exchange fins is 24.

7. The journal bearing shaft according to claim 1, wherein a number of the heat exchange fins is 12-32.

8. The journal bearing shaft according to claim 1, wherein a number of the heat exchange fins is 12-64.

9. A ram air fan assembly, comprising:

a fan rotor to move air from a fan inlet to a fan outlet; and a journal bearing shaft disposed as a single monolithic body within the fan rotor and defining a flow path for cooling air, the single monolithic body comprising:

a tie rod;

an end cap integrally connected to and extending radially outwardly from an end of the tie rod and defining openings;

a journal bearing interface portion integrally connected to and extending aft from a distal edge of the end cap; and a heat exchanger integrally connected to and extending aft from an aft edge of the journal bearing interface portion and comprising an exterior body and heat exchange fins extending radially between the exterior body and the tie rod.

10. The ram air fan assembly according to claim 9, wherein a length of the tie rod exceeds a total length of the journal bearing interface portion and the heat exchanger.

11. The ram air fan assembly according to claim 9, wherein the end cap comprises:

an inboard end cap portion, which extends radially outwardly from the end of the tie rod; and an outboard end cap portion, which extends radially outwardly and aft from a distal edge of the inboard end cap portion.

12. The ram air fan assembly according to claim 9, wherein the journal bearing interface portion and the heat exchanger are coaxial with the tie rod.

13. The ram air fan assembly according to claim 9, wherein an interior diameter of the heat exchanger is smaller than an interior diameter of the journal bearing interface portion.

14. The ram air fan assembly according to claim 9, wherein a number of the heat exchange fins is 24.

15. The ram air fan assembly according to claim 9, wherein a number of the heat exchange fins is 12-32.

16. The ram air fan assembly according to claim 9, wherein a number of the heat exchange fins is 12-64.

17. A method of additively manufacturing a journal bearing shaft as a single monolithic body, the method comprising:

building up a first tie rod portion;

simultaneously building up a second tie rod portion from the first tie rod portion and a heat exchanger about the second tie rod portion to comprise an exterior body and heat exchange fins extending radially between the second tie rod portion and the exterior body;

simultaneously building up a third tie rod portion from the second tie rod portion and a journal bearing interface portion from the heat exchange portion and about the third tie rod portion; and simultaneously building up an end of the tie rod from the third tie rod portion and an end cap from the journal bearing interface portion to connect with the end of the tie rod.

18. The method according to claim 17, wherein the building up of the end cap comprises:

building up an inboard end cap portion to extend radially outwardly from the end of the tie rod; and building up an outboard end cap portion from the journal bearing interface portion to extend radially outwardly and aft from a distal edge of the inboard end cap portion.

19. The method according to claim 17, wherein:

the building up of the heat exchanger and the second tie rod portion is executed such that the heat exchanger and the second tie rod portion are coaxial, and the building up of the journal bearing interface portion and the third tie rod portion are executed such that the journal bearing interface portion and the third tie rod portion are coaxial.

20. The method according to claim 17, wherein the building up of the heat exchanger and the journal bearing interface portion are executed such that an interior diameter of the heat exchanger is smaller than an interior diameter of the journal bearing interface portion.

* * * * *